June 15, 1965 C. J. RENKEN, JR 3,189,817
DEVICE FOR TESTING METAL SHEETS BY MEASURING THE TIME
REQUIRED FOR ELECTROMAGNETIC PULSES
TO PASS THERETHROUGH
Filed Oct. 26, 1960 2 Sheets-Sheet 1
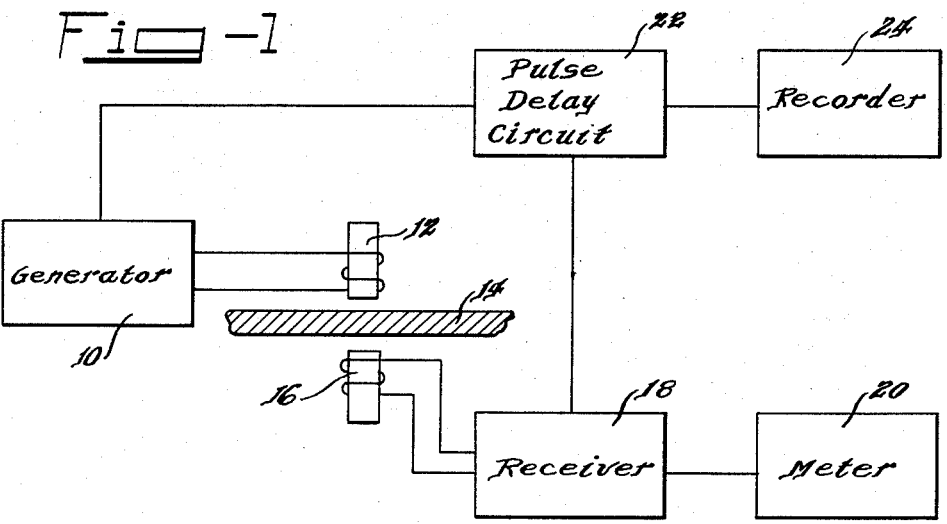
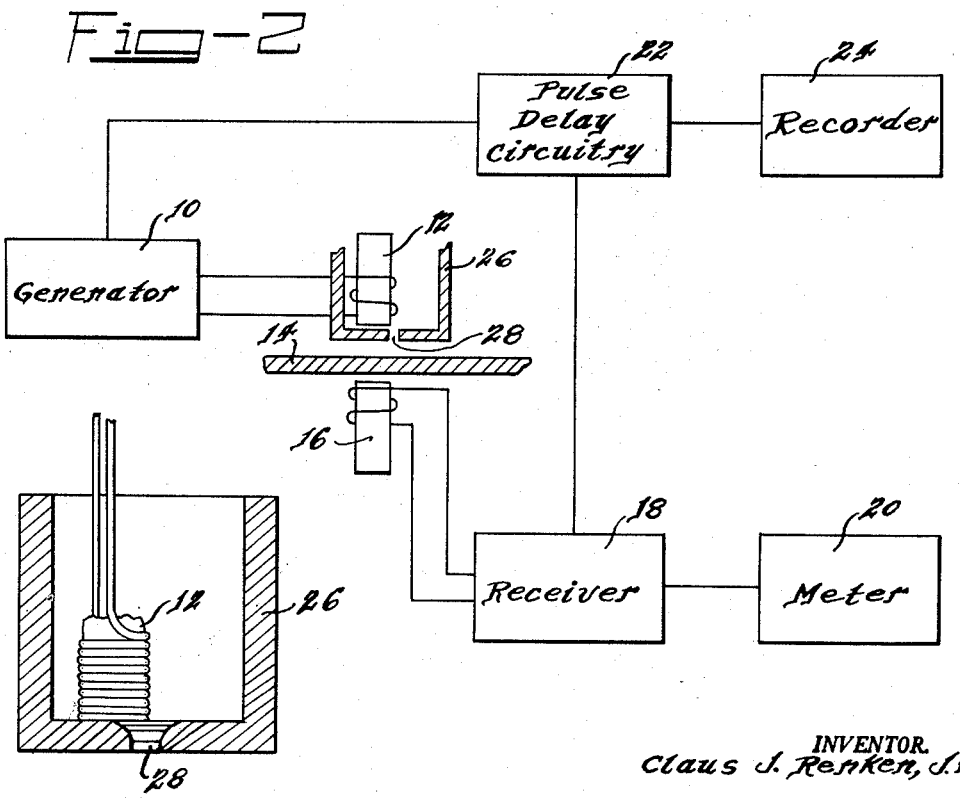
INVENTOR.
Claus J. Renken, Jr.
BY
Roland A. Anderson
Attorney June 15, 1965  C. J. RENKEN, JR  3,189,817
DEVICE FOR TESTING METAL SHEETS BY MEASURING THE TIME
REQUIRED FOR ELECTROMAGNETIC PULSES
TO PASS THERETHROUGH
Filed Oct. 26, 1960  2 Sheets-Sheet 2

INVENTOR.
Claus J. Renken, Jr.
BY
Roland A. Anderson
Attorney 3,189,817
DEVICE FOR TESTING METAL SHEETS BY MEASURING THE TIME REQUIRED FOR ELECTROMAGNETIC PULSES TO PASS THERETHROUGH
Claus John Renken, Jr., Orland Park, Ill., assignor to the United States of America as represented by the United States Atomic Energy Commission
Filed Oct. 26, 1960, Ser. No. 65,241
5 Claims. (Cl. 324—37)

This invention relates to nondestructive testing and more specifically to devices using the transmission of a pulsed electromagnetic field through metal sheet to detect irregularities therein.

It is a well known technique in measuring the thickness of metal sheet for one to apply a continuous A.-C. signal to a first coil on one side of said sheet and detect the amplitude of the signal received by a second coil on the other side of said sheet, which amplitude of the received signal is a function of the thickness of the metal sheet. However, variations in coil-to-metal sheet spacing cause variations in received signal amplitude and it is necessary to compensate therefor. Further, due to the tremendous attenuation by good conductors of high frequency electromagnetic fields, a high power input signal is required to give a satisfactory received signal, and consequently, it is necessary to employ large coils and low frequencies. The poor resolution offered by the use of large coils makes it practically impossible to detect all but obvious subsurface irregularities in the metal sheet.

The present invention utilizes the transmission of a pulsed signal through the metal sheet and measures the time delay thereof caused by the metal sheet to detect subsurface irregularities therein, which time is independent of the coil-to-metal sheet spacing. Since a pulsed signal is used, the size of the coils in the present invention is materially reduced over those of the prior art and greatly improved resolution is obtained therefrom.

It is therefore one object of this invention to provide a device to detect subsurface irregularities in metal sheet independent of coil-to-metal sheet spacing.

It is another object of this invention to provide a device using the transmission of electromagnetic fields through metal sheet to improve the resolution of the detected signal therefrom.

Other objects and advantages of this invention will become apparent in a further study of the specification in view of the accompanying drawings in which:

FIGURE 1 is a block circuit diagram of one embodiment of an apparatus for the present invention.

FIGURE 2 is a block circuit diagram of the preferred embodiment of an apparatus for the present invention.

FIGURE 3 is a cross section view of the mask having the transmitting coil therein of the apparatus in FIGURE 2.

Figure 5:
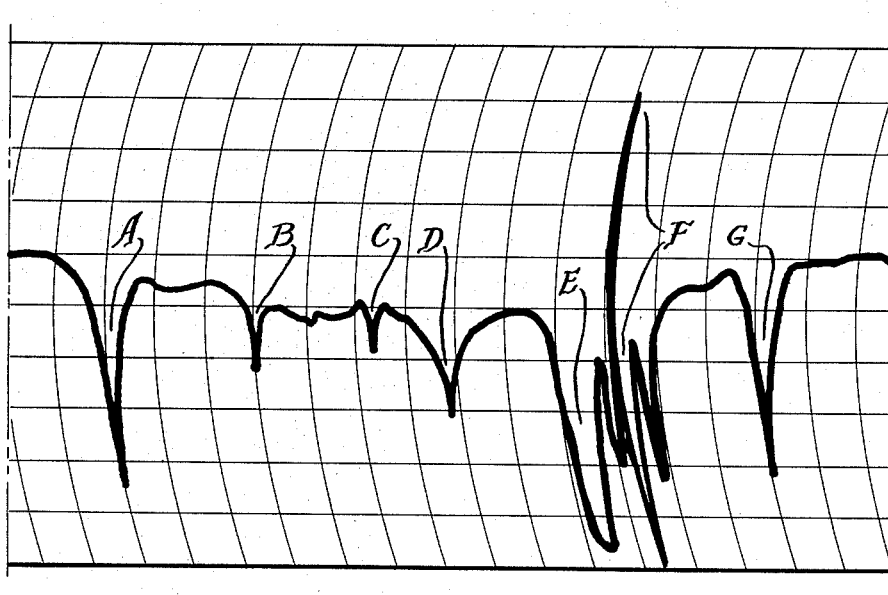
FIGURE 5 is a plot of output signals as detected by the apparatus of FIGURE 2 for 16 gauge stainless steel having known defects therein.

In FIGURE 1, a pulse generator 10 transmits a pulse to a transmitting coil 12. The resultant pulsed electromagnetic field generated by coil 12 is transmitted through metal sheet 14 and is detected by a receiving coil 16. The output of coil 16 is fed to a receiver 18 where it is amplified and rectified for recording by meter 20 which monitors the amplitude of the received signal. A pulse delay measuring circuit 22 receives an output pulse from receiver 18 and a reference pulse from generator 10 and measures the time delay therebetween. The resultant output from the pulse delay measuring circuit is then fed to a recorder 24.

The transmitting coil 12 of the apparatus in FIGURE 1 is made as small as possible to optimize resolution, but its size is limited by the amount of heat required to be dissipated which, in turn, is dependent upon the material under test (metal sheet 14). The receiving coil 16 is not critical in size, but should have sufficient turns to detect the electromagnetic field emanating from the transmitting coil 12. Both coils 12 and 16 are mounted so that their axes are normal to the plane of the metal sheet 14 and receiving coil 16 is aligned with the transmitting coil 12 to detect the electromagnetic field radiating therefrom. The spacing between both coils is fixed.

As a pulse signal is applied to coil 12 in FIGURE 1, a pulsed electromagnetic field will result therefrom. This field will impinge on the metal sheet 14 where a part of the energy thereof will be reflected due to the mismatch between the intrinsic impedance of free space and the internal impedance of the metal sheet 14. The remainder of the field enters the metal sheet 14 where a portion of the energy thereof will again be reflected by the far side of the metal sheet 14 and any discontinuities therein. The remaining pulsed field emerges from the metal sheet 14 to be detected by receiving coil 16. As the electromagnetic field traverses the metal sheet 14, the velocity of propagation of the main "bundle" of energy therein will be different from that in free space. Thus, whenever a discontinuity appears in the metal sheet 14, the time required for the main "bundle" of energy of the field to traverse the metal sheet 14 will change, the amount of change being a function of the discontinuity in the metal sheet. Since the distance between the two coils 12 and 16 is fixed, the time delay of the transmittal signal as measured by recorder 24 in the apparatus of FIGURE 1 is practically independent of all test variables, including coil-to-metal sheet 14 spacing, except those concerned with the internal structure of the metal sheet 14.

As previously mentioned, there is a physical limitation on the size of the transmitting coil 12 in the apparatus of FIGURE 1 due to the heat dissipation requirement, and hence, there is a physical limitation on the resolution achieved by the apparatus of FIGURE 1 due to the relative size of the electromagnetic field generated by the transmitting coil 12. Further improvement in resolution may be obtained by shielding the transmitting coil 12 to permit only a portion of the electromagnetic field generated therefrom to be transmitted to the metal sheet 14.

FIGURE 2 illustrates the preferred embodiment of an apparatus for the present invention wherein a mask 26 is employed to permit only a portion of the electromagnetic field generated by the transmitting coil 12 to be transmitted to the metal sheet 14. Except for the mask 26, the apparatus illustrated in FIGURE 2 is the same as the apparatus shown in FIGURE 1 and has the same general theory of operation.

Figure 4:
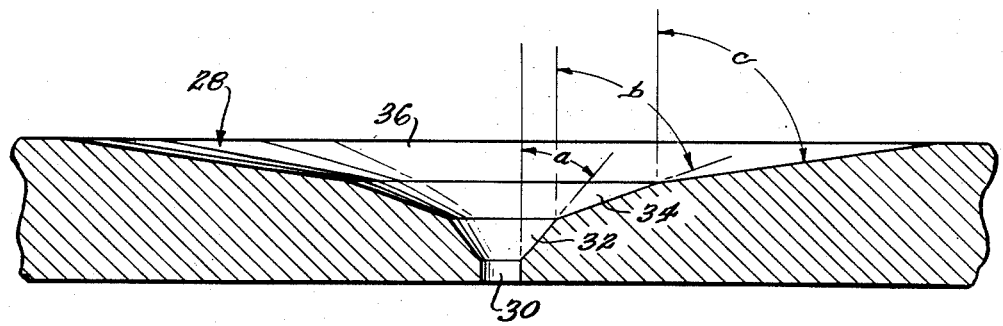
FIGURE 4 is an enlargement of the aperture in the mask of FIGURE 3.

The mask 26 is cylindrical in shape and surrounds the transmitting coil 12. The material of construction in the mask 26 should be a conductor having electrical conductivity approximately equal to or better than copper. The thickness of the material necessarily depends upon the pulse lengths employed since no energy should be transmitted through the wall of the mask 26. However, even in the case of very short pulse lengths, the thickness of the mask 26 should be sufficient for the construction of a properly shaped aperture 28 therein. The aperture 28, as illustrated in FIGURE 3, is cut into the base 30 of the mask in the general configuration of a truncated cone. In the preferred embodiment, the aperture 28 comprises four sections as illustrated in FIGURE 4 which is an enlargement of the aperture 28 in the mask 26 of FIGURE 3. The first section is a straight opening 30 to the metal sheet 14 having a diameter of approximately 1/16 of an inch. The second, third and fourth sections are a series of truncated cones 32, 34 and 36 having increasing angles of generation $a$, $b$ and $c$ away from the opening 30 of approximately 40 degrees, 60 degrees and 69 degrees respectively. The height of each of the truncated conic sections 32, 34 and 36 is approximately equal, but it should be noted that the height of the opening 30 should not be less than 1/64 of an inch to maintain maximum resolution of the apparatus in FIGURE 2.

As illustrated in FIGURE 3, when the mask 26 is used in the apparatus of FIGURE 2, the axis of the transmitting coil 12 must be positioned off-center with respect to the aperture 28 in order that a net energy flow of the electromagnetic field from transmitting coil 12 may be obtained therethrough. In the apparatus of FIGURE 2, as in the apparatus of FIGURE 1, the spatial distance between coils 12 and 16 is fixed. Since the distance between the mask 26 and the coils 12 and 16 is also fixed in FIGURE 2, the time delay of the transmitted signal as measured by the recorder 24 in the apparatus of FIGURE 2 is practically independent of all test variables, including coil-to-metal sheet 14 spacing, except those concerned with internal structure of the metal sheet 14.

FIGURE 5 is a trace of the results obtained from recorder 24 in the apparatus of FIGURE 2 when scanning a piece of 16 gauge 304 stainless steel wherein various size drill holes had been made. Stainless steel was purposely picked for this illustration since its poor conductivity made it a difficult metal to obtain good resolution therefrom for defects therein. The transmitting coil 12 of the apparatus in FIGURE 2 comprised a two layer winding of #40 wire having an axial length of 1/4 inch wound on a 1/4 inch diameter ferrite core. The applied signal to the transmitting coil 12 was a 1 microsecond pulse with a repetition rate of 1000 pulses per second and having a peak power of approximately 1 kilowatt. On the trace illustrated in FIGURE 5:

A represents a signal obtained from a 0.0135 inch diameter hole drilled completely throuugh the plate;

B represents a signal obtained from a 0.0059 inch diameter hole drilled 0.02 inch deep in the plate;

C represents a signal from a 0.0059 inch diameter hole drilled 0.02 inch deep in the plate with the center of the hole located 0.005 inch away from the center line of the other holes;

D represents a signal obtained from a 0.0098 inch diameter hole drilled 0.02 inch deep in the plate;

E represents a signal obtained from a 0.04 inch diameter hole drilled 0.005 inch deep in the plate;

F represents a signal obtained from a 0.04 inch diameter hole drilled completely through the plate;

G represents a signal obtained from a 0.0135 inch diameter hole drilled completely through the plate.

For aluminum sheet 1/16 of an inch thick, 0.004 inch diameter holes drilled to a depth of 0.005 inch are easily detectable using the apparatus of the preferred embodiment.

Persons skilled in the art will, of course, readily adapt the general teachings of the invention to embodiments far different than the embodiments illustrated. Accordingly, the scope of the protection afforded the invention should not be limited to the particular embodiments illustrated in the drawings and described above, but should be determined only in accordance with the appended claims.

What is claimed is:

1. A device for testing conductive metal sheet comprising a first coil on one side of said sheet and spaced therefrom, a second coil on the other side of said sheet and spaced therefrom, means for applying a pulsed signal to one of said coils, and means for detecting the time delay of the signal received by the other coil due to the presence of said sheet.

2. A device for testing conductive metal sheet comprising a first coil on one side of said sheet and spaced therefrom; a second coil on the other side of said sheet, spaced therefrom and aligned with said first coil; means for applying a pulsed signal to one of said coils; and means for detecting the time delay of the signal received by the other coil due to the presence of said sheet.

3. A device for testing conductive metal sheet comprising a transmitting coil on one side of said sheet and spaced therefrom; a receiving coil on the other side of said sheet spaced therefrom and aligned with said transmitting coil; means for applying a pulsed signal to said transmitting coil; means for shielding said transmitting coil to cause only a portion of the pulsed electromagnetic field resulting from said pulsed signal applied to said transmitting coil to be transmitted therefrom to said sheet; and means for detecting the time delay of the signal received at said receiving coil due to the presence of said sheet.

4. The device according to claim 3 wherein said shielding means comprise a cylinder surrounding said transmitting coil, said cylinder having an aperture therein to permit only a portion of the pulsed electromagnetic field resulting from the pulsed signal applied to said transmitting coil to be transmitted therethrough, said cylinder having walls of sufficient thickness and electrical conductivity to absorb the energy of the pulsed electromagnetic field.

5. The device according to claim 4 wherein the axis of said transmitting coil is parallel to the sides of said cylinder, normal to the plane of said metal sheet, and positioned off center with respect to the aperture of said cylinder; and the aperture of said cylinder has a generally conical configuration.

References Cited by the Examiner
UNITED STATES PATENTS

| | | | |
|---|---|---|---|
| 2,057,835 | 10/36 | Karajan et al. | 324—40 |
| 2,764,734 | 9/56 | Yates | 324—40 |
| 2,931,973 | 4/60 | Puranen | 324—34 |
| 3,107,329 | 10/63 | McSkinin | 324—58.5 |

WALTER L. CARLSON, *Primary Examiner.*
SAMUEL BERNSTEIN, *Examiner.*